United States Patent [11] 3,615,679

| [72] | Inventors | Frank P. Tangel<br>Oakland;<br>Argillo Musetti, Fairlawn, both of N.J. |
|---|---|---|
| [21] | Appl. No. | 772,389 |
| [22] | Filed | Oct. 31, 1968 |
| [45] | Patented | Oct. 26, 1971 |
| [73] | Assignee | Buitoni Foods Corporation |

[54] FROZEN PIZZA AND DOUGH
21 Claims, No Drawings

[52] U.S. Cl. .................................................. 99/86,
99/92, 99/192 BB
[51] Int. Cl. ........................................................ A21d 13/08
[50] Field of Search ........................................... 99/86, 92,
87, 192 BB; 107/1, 1.1, 1.6, 1.65, 7, 54, 54.2

[56] References Cited
UNITED STATES PATENTS

| 1,596,652 | 8/1926 | Giovannetti | 99/86 UX |
| 2,668,117 | 2/1954 | Bucci | 99/92 X |
| 2,714,861 | 8/1955 | Castronuovo | 99/86 UX |
| 2,774,316 | 12/1956 | Daino | 99/86 UX |

*Primary Examiner*—Raymond N. Jones
*Assistant Examiner*—James R. Hoffman
*Attorney*—Irvin A. Lavine

ABSTRACT: The present invention relates to a frozen food product in the nature of a pizza which may be baked to completion in an ordinary toaster. This food product has two layers of leavened dough sealed at the edges and forming a pocket therebetween in which is a filling of tomato sauce and cheese. A dough is provided of Durum wheat, leavening and other ingredients.

FROZEN PIZZA AND DOUGH

BACKGROUND OF THE INVENTION

The present invention pertains to edible partially cooked pizza frozen to preserve it, and of a size to be finishbaked in an ordinary toaster; it also pertains to a dough for such a pizza.

Pizzas have long been known to comprise a leavened layer of dough and a filling or sauce made principally of tomatoes, tomato paste, seasoning, and shortening. At present, pizzas are frequently sold at carry-out shops where a previously prepared disc or square of dough, substantially rigid, is covered with a prepared tomato sauce, with cheese sprinkled over the sauce, and the combination is then baked in an oven, for a period of about 7 minutes. In addition, there are available frozen pizzas which have the ingredients essentially as set forth above in an appropriate wrapping or package, which may be stored in an ordinary household freezer or freezer compartment of a refrigerator. With these frozen pizzas, it is necessary for the consumer to preheat an oven for a period of some 30 minutes, after which the frozen pizza may be placed into the oven and baked for a period of approximately 7 to 10 minutes. Such pizzas will be seen to require the preheating of an oven, and thus do not permit the preparation of a pizza quickly, in less than half an hour, after it has been decided that a pizza is to be eaten. There is also reluctance by the consumer to heat an oven for a small portion of pizza.

It has previously been proposed to encase an ordinary, open-face pizza of appropriate size in a bag of packaging material, the combination of the pizza and packaging material being then inserted into a toaster for cooking or baking. This has the disadvantage that after the completion of the cooking or baking in the toaster, the pizza must be removed from the relatively hot packaging material. Consequently this arrangement is one which is not facile to handle.

Further, it has been proposed to place pizza filling between two slices of bread, which are then compressed, edgesealed and frozen. This construction is not satisfactory, because bread does not have the taste or texture of genuine pizza dough. Further, it is doubtful that a satisfactory seal between the two bread layers can be obtained, so that it is likely that the bread slices will not remain sealed, resulting in leakage of the pizza filling. In addition, bread is so porous that it is likely that the pizza-filling material, if of normal pizza filling consistency, at room or eating temperature would leak through the bread cells and thus soil the toaster, as well as being messy to handle by the consumer.

It is also known to provide pastries for cooking in a toaster, these being made of two layers of dough which is essentially dry and crumbly like a cracker dough, and having a jelly or the like filling. These pastries are not frozen, and the filling is generally of solid material, as distinguished from a saucelike or semifluid material, so that in practice the dough layers have actually been perforated. As a consequence, due to the dry nature of the jelly filling, when this pastry is heated from room temperature, the filling material does not become saucelike or semiliquid and does not leak through the perforations.

SUMMARY OF THE INVENTION

A pizza type food product is provided which is partially baked, and then frozen. The pizza comprises two layers of dough made of durum flour and containing a leavening agent, such as yeast. The product, ready for the toaster, has a pizza sauce filling in a pocket between two imperforate, peripherally sealed dough layers. The pizza filling material comprises principally cooked tomatoes and tomato paste, and additional ingredients including conventional pizza sauce flavors and spices, and is flowable at eating temperature. The pizza product has a maximum dimension to permit its insertion into commercially available toasters, and the relative weight of the filling and the dough layers is such as to give a normal taste and texture when consumed. In addition, the dough layers preferably contain flavoring material, and the dough layers are not only imperforate, but are made of dough having significant strength and relatively small cells throughout so that when the pizza is heated, the pizza-filling material, being then of normal saucelike consistency, does not pass through the dough layers. The dough layers in both the frozen state and the heated state after finishcooking in the toaster give sufficient structural strength to the pizza to permit all necessary handling.

Among the objects of the present invention are to provide a pizza which may be finish cooked in ordinary toasters, which may be preserved by freezing, which will not leak on or otherwise soil a toaster, which will have a pleasing and normal-pizza taste, which does not require handling of or the insertion into a toaster of packaging material, and which may be handled in either the frozen or heated state with great facility, and without becoming so flaccid as to fall or separate accidentally at any stage of the handling or eating thereof.

DESCRIPTION OF THE PREFERRED EMBODIMENT

The pizza of the present invention is made of two dough layers; this dough must have a number of characteristics in order for the pizza to be acceptable from the viewpoint of handling while in both the frozen and the heated states. The dough must not be pervious to a sauce having a significant portion of liquid constituent, particularly in the heated state. The dough must also have the ability to be formed into a layer which may be sealed by pressure with another layer of the dough. When heated, the dough must not be dry, flakey, crackerlike or overly soft, nor may it be porous with a great number of large air cells within it. When heated, it should have adequate tensile strength to permit the pizza to be lifted in the heated condition, without tearing apart due to the weight of a portion of the dough layers and some or all of the weight of the filling. Further, after heating in the toaster the dough itself should be crisp and soft enough to be chewable, without being overly stringy. Preferably, the dough should be able to accept for inclusion in it flavoring and seasoning materials without adverse effect on any of its other properties.

The above set forth desired characteristics are achieved in the present invention in a dough composition which is made essentially from 300 pounds of durum wheat flour, with about 105 pounds to about 125 pounds water, about 3 pounds to about 9 pounds corn oil, about 7 pounds to about 11 pounds of compressed yeast, and about 7 pounds to about 10 pounds malt; salt; and minor amounts of sugar, spice, and garlic are also used. Expressed in relation to 100 unit weights of durum wheat flour, these proportions are 35–42 unit weights of water, 1–3 unit weights of corn oil; 1–2.3 unit weights of salt, 2.3–3.7 unit weights of compressed yeast, and 2.3–3.3 unit weights of malt. The spice, specifically oregano, and the garlic provides a pizza flavor to this dough. A dough having the above qualities specifically contains, to each 300 pounds of durum wheat flour, about 117 pounds of water, about 5.8 pounds of corn oil, about 5.3 pounds of salt, about 9 pounds of compressed yeast and about 8.4 pounds of malt. Expressed in relation to 100 unit weights of durum wheat flour, these proportions are 38.9 unit weights of water, 1.9 unit weights of corn oil, 1.75 unit weights of salt, 3 unit weights of compressed yeast and 2.8 unit weights of malt. These doughs not only have the above desired characteristics, but in addition, lend themselves to handling before being cooked, by this being meant kneading, sheeting, or extrusion, and cutting.

While it is possible that shortening other than corn oil and leavening other than compressed yeast may be used, these particular ingredients have been found to be most satisfactory.

It is significant that the dough is of durum wheat flour and a leavening agent therein, specifically an unusually high amount of leavening agent. Durum flour provides a dough having great strength, and while it has previously been used for food products, it has not previously been combined with a leavening agent. Prior pizza doughs using ordinary flour have had a flour to yeast ratio of about 100 to 1.25 by weight, whereas with the present dough the ratio is about 100 to 3. The dough when mixed and kneaded is relatively thick and can easily be handled on baker's paddles; it is proofed to permit leavening and is only partially baked, after which it is frozen. The dough after these steps and in its frozen condition is partly raw, relatively stiff, and contains small cells which have been produced by gas evolved from the leavening agent. When finish cooked as in a toaster, the dough is not flaccid, but has sufficient stiffness and tensile strength to permit removal of the pizza from the toaster and to permit any further necessary handling, such as placement on dishes or trays, and the handling while being eaten with the fingers so that the pizza does not come apart or break open; consequently, the dough has the normal appearance and texture associated with conventional pizzas, while being different therefrom in that it has superior-rheological properties to enable it to be handled as above set forth, and preferably is flavored.

The dough is initially sheeted, two sheets being produced with a filling as specified herein below placed between the two sheets and the sheets are then edgesealed together so that the two sheets have a pocket between them, within the peripherally sealed edges thereof, the two dough layers being of approximately the same size and shape.

The sauce is a tomato base sauce and comprises from about 20 to 50 percent peeled tomatoes, from about 35 to about 45 percent tomato paste, from about 5 to about 20 percent water, from about 5 to about 8 percent vegetable oil, from about 2 to about 4 percent corn starch and minor amounts of salt, sugar, spices and garlic. Preferably, the peeled tomatoes comprise about 29 percent, the tomato paste about 41 percent, the water about 16 percent, the vegetable oil about 6.5 percent and the corn starch about 3.2 percent. These percentages are of the total weight of the sauce, without cheese added to it. To approximately 100 pounds of sauce, approximately 60 pounds of Mozzarella cheese are added. The sauce comprises about 72 percent liquids, and 28 percent solids, and determined by dehydration and weighing tests normal in the art. This sauce, including the cheese, is semiliquid and easily flowable at both room temperature and the elevated temperature achieved in a toaster; its consistency or thickness is similar to that of tomato paste, and the sauce has good flavor, appealing palatability, and does not weep, i.e., the liquid or a part of the liquid content does not separate out and run.

The pizza according to the present invention is in a partially cooked state, and is frozen, being storable in a freezer or refrigerator freezer compartment until ready for use. It is thin enough to be placed in a standard, commercially available toaster, and to that end its thickness does not exceed in the frozen state three-fourths inches and is preferably eleven-sixteenths inches.

The pizza in its frozen state is rigid, and therefore may be readily handled to remove it from its package and placed, devoid of any exterior packaging, within a toaster. Within the toaster, both the pizza dough layers and the pizza-filling material are heated. This heating completes the baking or cooking of the pizza, and is therefore referred to as finish cooking; it changes the pizza dough by causing it to have a brown, pleasing appearance and a fully cooked taste, and in addition reduces the rigidity of the dough to a semisoft and chewable quality, which yet retains sufficient stiffness and tensile strength to prevent it from being pulled apart or from becoming so flaccid that it collapses due to the weight of the pizza filling within it. The finish cooking of the pizza dough also completes the attainment of the necessary flavor, temperature, texture, and other palatability factors. The heated pizza does not leak but is self contained because the two dough layers are sealed to each other about their peripheries, the pizza filling being within a pocket defined by the dough layers and the sealed portions of the dough layers remain sealed during the finish cooking. The cells or voids within the leavened-dough layers are relatively small, and the dough itself does not permit the passage through it of the more liquid components of the pizza sauce. In order to obtain a pizza which is palatable and appetizing, the weight of the filling or sauce is between 40 and 60 percent of the total product weight being preferably approximately 50 percent thereof. The sauce itself, when heated, is relatively flowable, having a considerable moisture content, so that it is not jellylike in consistency, but does not leak.

It would be obvious to those skilled in the art that various changes may be made without departing from the spirit of the invention and therefore the invention is not limited to what is described in the specification but only as indicated in the appended claims.

We claim:
1. A frozen pizza for finish cooking in a toaster comprising:
   a. first and second partially cooked dough layers of approximately the same size and shape sealed together at their edges and providing a pocket between them within their edges;
   b. each dough layer having been made essentially from approximately the following quantities of ingredients with 100 unit weights of durum wheat flour: 35–42 unit weights of water, 1–3 unit weights of corn oil, 1–2.3 unit weights of salt, 2.3–3.7 unit weights of compressed yeast, and 2.3–3.3 unit weights of malt;
   c. and a filling of sauce made essentially from tomato base and cheese in said pocket, the weight of said filling being approximately 40 to 60 percent of the total weight of said pizza.

2. The frozen pizza of claim 1, wherein said dough layers have been made essentially from approximately the following quantities of ingredients with 100 units of durum wheat flour: 38.9 unit weights of water, 1.9 unit weights of corn oil, 1.75 unit weights of salt, 3 unit weights of compressed yeast and 2.8 unit weights of malt.

3. The frozen pizza of claim 1, said dough layers further comprising garlic and oregano.

4. The frozen pizza of claim 1, wherein the weight of said filling is approximately 50 percent of the total weight of said pizza.

5. The frozen pizza of claim 1, wherein said sauce without said cheese has about 72 percent liquid content.

6. The frozen pizza of claim 1, wherein said sauce without cheese consists essentially of from about 20 to about 50 percent peeled tomatoes, from about 35 to 45 percent tomato paste, and from about 5 to about 20 percent water, by weight.

7. The frozen pizza of claim 6, wherein said sauce further consists of about 5 to about 8 percent vegetable oil, and about 2 to about 4 percent corn starch, by weight.

8. The frozen pizza of claim 1, wherein said sauce without cheese consists essentially of about 29 percent peeled tomatoes, about 41 percent tomato paste, and about 16 percent water, by weight.

9. The frozen pizza of claim 8, wherein said sauce further consists of about 6.5 percent vegetable oil and about 3.2 percent cornstarch.

10. A frozen pizza for finish cooking in a toaster comprising:
    a. first and second partially cooked dough layers of approximately the same size and shape sealed together at their edges and providing a pocket between them within their edges, said dough layers being leavened, having small air cells throughout and being substantially impervious to a pizza filling at an eating temperature about room temperature, said dough being made from durum wheat flour and leavening in an amount such that the leavening has a leavening effect equivalent to about 2.3 to about 3.7 unit weights of compressed yeast per 100 unit weights of said durum wheat flour;
    b. and a filling of sauce made from ingredients including tomato base and cheese, the weight of said filling being approximately 40 to 60 percent of the total weight of said pizza.

11. The frozen pizza of claim 10, said dough layers having been made from dough having approximately 3 unit weights of compressed yeast for each 100 unit weights of said durum wheat flour.

12. The frozen pizza of claim 10, said dough layers containing flavoring selected from the group consisting of garlic, oregano, and sugar.

13. A dough composition consisting essentially of about 35 to about 42 unit weights of water, about 1 to about 3 unit weights of corn oil, about 2.3 to about 3.7 unit weights of compressed yeast and about 2.3 to about 3.3 unit weights of malt with about 100 unit weights of durum wheat flour.

14. The dough composition of claim 13, wherein said water is about 38.9 unit weights, said corn oil is about 1.9 unit weights, said compressed yeast is about 3 unit weights and said malt is about 2.8 unit weights.

15. The dough composition of claim 13, and further including flavoring selected from the group consisting of garlic, oregano, and sugar.

16. The dough composition of claim 13, and further including garlic, oregano, and sugar.

17. A frozen food product for finish cooking in a toaster comprising:
   a. first and second partially cooked dough layers of approximately the same size and shape sealed together at their edges and providing a pocket between them within their edges, said dough layers being leavened, having small-air cells throughout and being substantially impervious to a filling having a substantial moisture content and which is relatively flowable when heated, said dough being made from durum wheat flour and leavening in an amount such that the leavening has a leavening effect equivalent to about 2.3 to about 3.7 unit weights of compressed yeast per 100 unit weights of said durum wheat flour,
   b. and an edible filling in said pocket which is relatively flowable when heated, has a substantial moisture content, and has a weight of approximately 40 to 60 percent of the total weight of said product.

18. The frozen food product of claim 17, said dough layers being of dough having a composition consisting essentially of durum wheat flour, water, shortening and leavening, said water being about 35 to 42 unit weights to 100 unit weights of said flour, said leavening being in an amount such that it has a leavening effect equivalent to about 2.3 to about 3.7 unit weights of compressed yeast to 100 unit weights of said flour.

19. A dough composition which is chewable when cooked, has small air cells throughout, significant tensile strength and is substantially impervious to a saucelike material, said dough consisting essentially of durum wheat flour, water, shortening and leavening, said water being about 35 to 42 unit weights to 100 unit weights of said flour and said leavening being in an amount such that it has a leavening effect equivalent to about 2.3 to about 3.7 unit weights of compressed yeast to 100 unit weights of said flour.

20. The dough composition of claim 19, wherein said leavening is about 2.3 to about 3.7 unit weights of compressed yeast.

21. The dough composition of claim 19, wherein said shortening is about 1 to about 3 unit weights of corn oil.

* * * * *